Nov. 27, 1962 H. N. NERWIN, JR., ET AL 3,065,631
VISIBLE INDICATOR FOR SONIC THICKNESS MEASURING APPARATUS
Filed Oct. 31, 1957
4 Sheets-Sheet 1
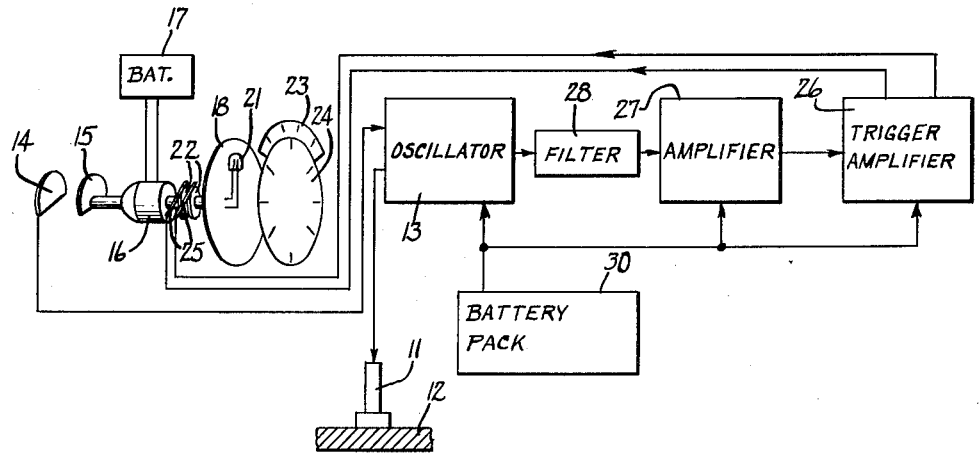
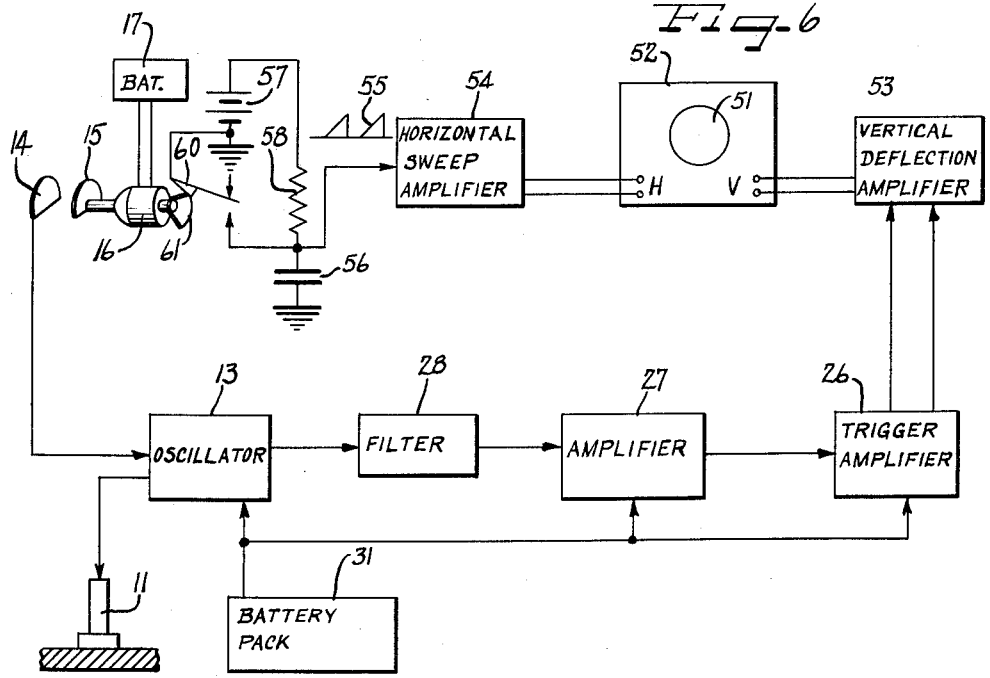
Inventors
Henry N. Nerwin, Jr.
Bernard H. Robinson, Jr.

Nov. 27, 1962 H. N. NERWIN, JR., ET AL 3,065,631
VISIBLE INDICATOR FOR SONIC THICKNESS MEASURING APPARATUS
Filed Oct. 31, 1957 4 Sheets-Sheet 2
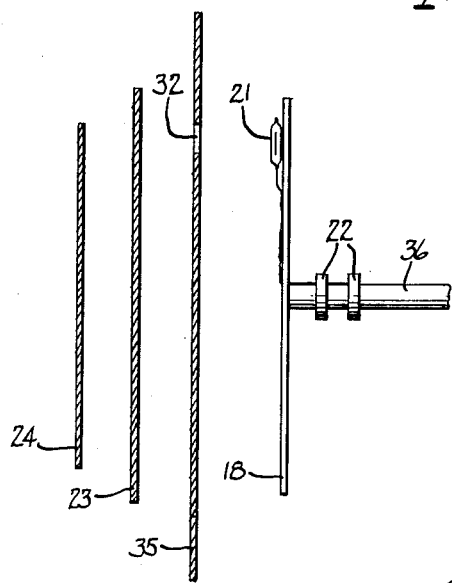
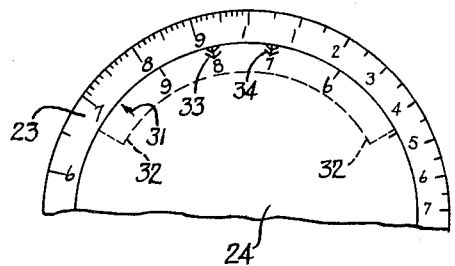
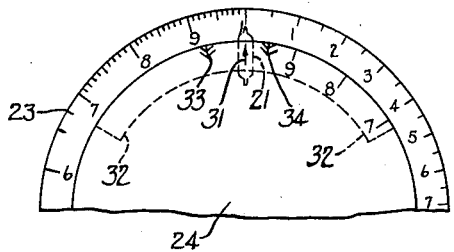
Inventors
Henry N. Nerwin, Jr.
Bernard H. Robinson, Jr.

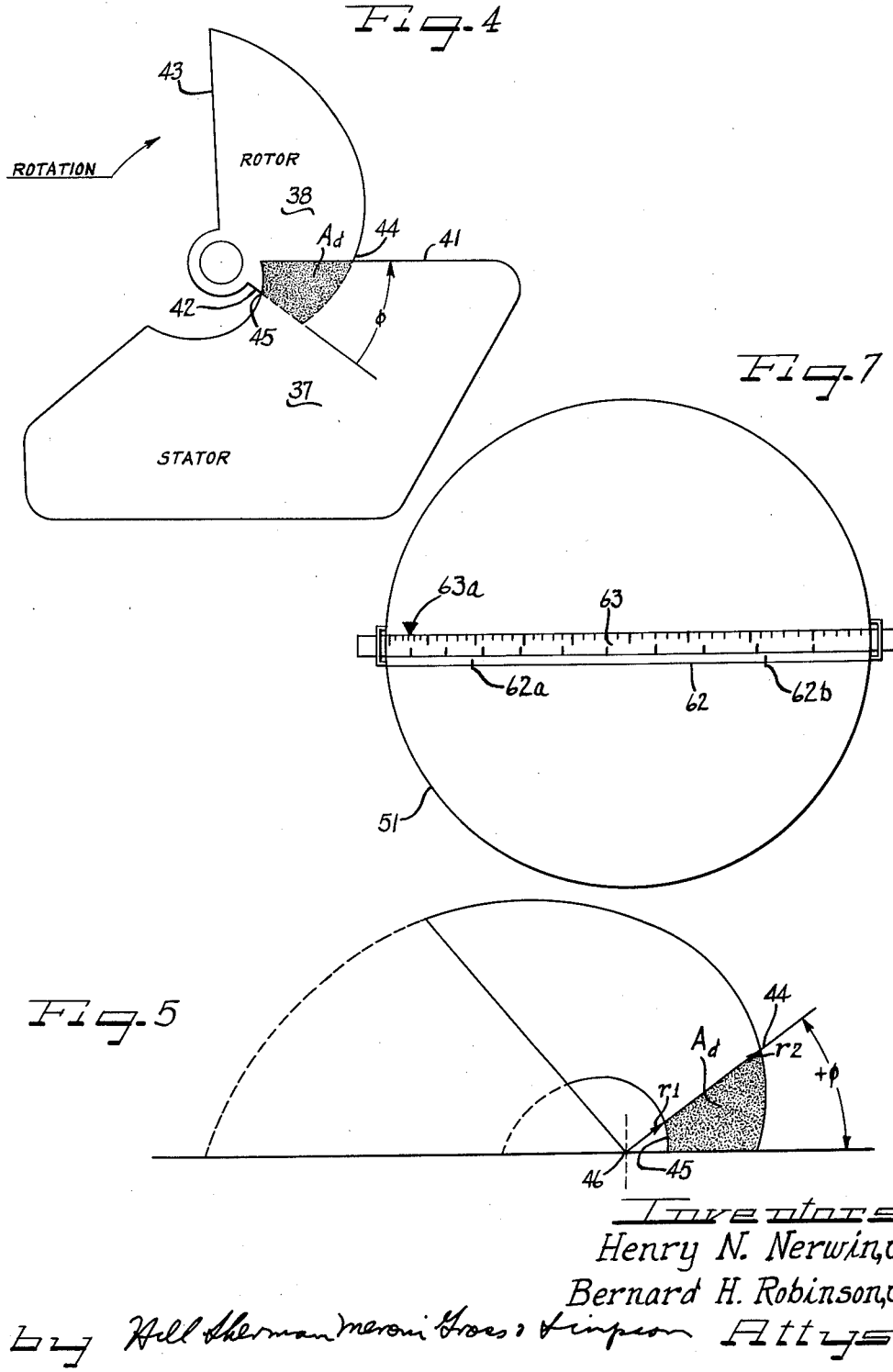

Nov. 27, 1962     H. N. NERWIN, JR., ET AL     3,065,631
VISIBLE INDICATOR FOR SONIC THICKNESS MEASURING APPARATUS
Filed Oct. 31, 1957     4 Sheets-Sheet 4
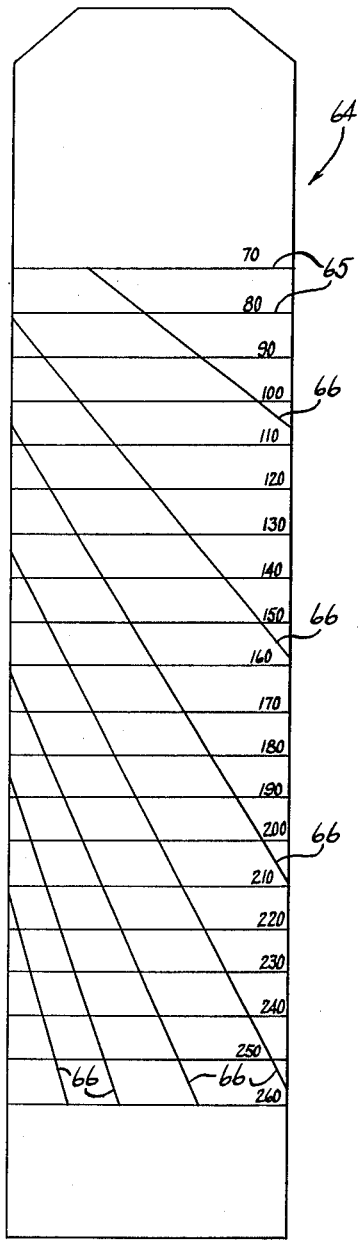
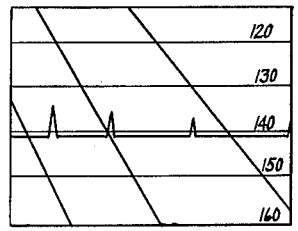
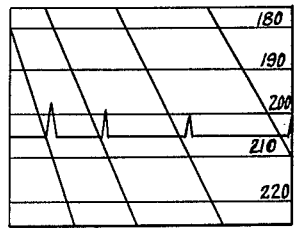
Inventors
Henry N. Nerwin, Jr.
Bernard H. Robinson, Jr.

United States Patent Office 3,065,631
Patented Nov. 27, 1962

3,065,631
VISIBLE INDICATOR FOR SONIC THICKNESS
MEASURING APPARATUS
Henry N. Nerwin, Jr., Chicago, and Bernard H. Robinson, Jr., Arlington Heights, Ill., assignors to Magnaflux Corporation, Chicago, Ill., a corporation of Delaware
Filed Oct. 31, 1957, Ser. No. 693,748
2 Claims. (Cl. 73—67.8)

The present invention relates in general to sonic thickness measuring apparatus and more particularly concerns a system for providing a direct indication of the thickness of material despite the appearance of multiple responses upon the visual indicating means.

At the outset, it should be noted that the term "sonic" is used herein to include compressional waves or vibrations whether audible or inaudible, so as to include waves usually referred to as "ultrasonic" or sometimes "supersonic," having a frequency higher than audible to the human ear. Normally, the frequency used in the practice of this invention are inaudible and hence ultrasonic or supersonic.

A sonic measuring system is utilized to detect the thickness of material by noting the frequency of a signal which excites standing waves within the material. When an oscillator is tuned to a frequency at which a standing wave is excited in the material under test, and a transducer utilized to exchange electrical and sonic energy between the oscillator and material respectively, a marked increase in the loading upon the oscillator may be detected. In much the same manner as higher order sonic waves are excited in an organ pipe at audio frequencies, standing waves are excited in integrally related modes at ultrasonic frequencies. The fundamental frequency is determined by the relationship $$f = \frac{V}{2T}$$

where $f$ is the fundamental frequency in cycles per second, $V$ is the propagational velocity of ultrasonic energy within the material in inches per second, and $T$ is the thickness of material in inches. The relation between the fundamental frequency $f$ and the higher order frequencies which excite higher order modes within the material is given by the relation $$f = \frac{f_n}{n}$$

where $f_n$ is the frequency of the harmonic and $n$ is the order of the harmonic. It is convenient to define a quantity $t_n$ as the half wavelength of the $n$th harmonic within the material. Then, it can be shown that $$\frac{1}{T} = \frac{1/n}{t_n}$$

and a determination of two or more successive harmonic half wavelengths will be determinative of the thickness of the material. The fundamental half wavelength, which corresponds to the material thickness, may be determined from known half wavelengths of successive harmonics by using a conventional slide rule. Integral markings on the CI, or reciprocal scale of the slide rule represent the order of the harmonic and are aligned opposite the corresponding successive harmonic half wavelengths on the D scale, the thickness of the material then appearing on the D scale opposite the index of the CI scale. This procedure may be used with any resonance type ultrasonic thickness instrument calibrated for frequency in terms of thickness, but it requires transferring numbers from the instrument to the D scale of the slide rule while matching the order of harmonics on the CI scale. This is a lengthy operation and conducive to errors.

The present invention contemplates and has as a primary object the provision of means for providing a direct visual indication of the thickness of material excited by ultrasonic waves. According to the invention, the frequency of an oscillator is swept across a predetermined portion of the frequency spectrum and the electrical energy from the oscillator and sonic energy within the material whose thickness is to be determined are interchanged by means of a transducer and the frequencies at which the oscillator is heavily loaded are visually indicated along a first scale, the indication being a direct measure of the half wavelength of each mode excited within the material. To determine the thickness of the material, there is a second scale with markings related to the integral harmonics and alignable along the first scale. By aligning adjacent ones of the latter markings along adjacent visual indications on the first scale, an index on the second scale points directly on the first scale to the thickness of the material being tested.

Another object of the invention is the provision of means for directly indicating the thickness of a material with sonic measuring apparatus of relatively small volume, yet efficiently employing the available space for accurately indicating the desired measurement. This is accomplished by utilizing a circular scale upon which the visual indications are marked. In this aspect of the invention, the oscillator frequency is swept by rotating the rotor plates of a variable capacitor. Synchronously with the rotation of the rotor plates, a neon bulb is rotated behind the first indicating scale whereby it is visible through the latter. The position of the bulb is then indicative of the contemporary oscillator frequency. When a resonant mode is excited in the material under test, means are provided for firing the bulb, thus effecting a visual flash on the first scale which may be calibrated to read directly in mode half wavelengths. When several modes are excited in the material during a single sweep, flashes will occur at a plurality of points on the first scale. The second scale is rotatably mounted within the first scale and is adjusted until adjacent markings thereon are aligned directly opposite adjacent flashes on the first scale. The index of the second scale then points on the first scale to the actual thickness of the material.

A further object of the invention is the provision of means for enabling the first scale to directly read the thickness of materials having different propagational characteristics. This feature is obtained by arranging the angular orientation of the first scale to be adjustable.

Still another object of the invention is the achievement of the foregoing objects with compact portable apparatus utilizing a reliable rugged oscillator sweeping means wherein positive synchronism is established between the latter and the visual indicating arrangement.

Important features of the invention relate to the relation of the movement of the indicating means, the scale markings and the operation of the sweep frequency oscillator. The instantaneous frequency is preferably proportional to the anti-logarithm of the distance of movement of the indicating means along its path of movement, and a scale member movable along a parallel path has successive markings positioned at points which are a logarithmic function of the distance along the scale member, with logarithmic scale means calibrated according to part thickness being provided for indicating the position of the scale member. The paths of movement may be arcuate, as in the case of the rotating neon bulb system above described, or may be in straight lines. For example, the indications may be produced in the form of pips on the face of a cathode ray oscilloscope and with a scale member being moved in a direction parallel to the sweeping movement of the cathode ray beam indicating means.

Other features, objects and advantages of the invention will become apparent from the following specification when read in connection with the accompanying drawing in which:

FIG. 1 is a block-pictorial diagram of a sonic thickness measuring system;

FIG. 2 illustrates the circular thickness and harmonic scales;

FIG. 3 is a view in a plane which includes the axis of the circular scales to show the relative position of the scales and the rotating disc to which the illuminating neon bulb is secured;

FIG. 4 shows the shape of the rotor and stator element of the sweep capacitor;

FIG. 5 is a diagram which defines parameters helpful in understanding the determination of the proper shape of the rotor as a function of angular orientation relative to the stator;

FIG. 6 is a block diagram of a cathode ray tube display system adapted to utilize the inventive concepts;

FIG. 7 illustrates a scale adapted to move horizontally across the tube face to yield a direct indication of thickness;

FIG. 8 shows a scale adapted to move vertically across the tube face to yield direct indications of thickness; and FIG. 9 demonstrates how the latter scale is aligned over pips displayed on the tube face to yield a direct indication of thickness.

In the drawing, like reference symbols designate the same elements throughout.

With reference now to the drawing, and more particularly FIG. 1 thereof, there is illustrated a block-pictorial diagram of a sonic measuring system. A crystal transducer 11 is placed adjacent material 12 to determine the thickness of the latter, the crystal probe 11 serving as a transducer for exchanging electrical energy and sonic energy between the oscillator 13 and material 12, respectively. The frequency of oscillator 13 is swept in accordance with the change in capacity between stator plate 14 and motor plate 15 as the latter is rotated by motor 16 energized by motor battery 17. Motor 16 also rotates disc 18 to which neon bulb 21 is affixed, the electrodes of the latter being connected to slip rings 22. Points opposite thickness scale 23 are illuminated when neon bulb 21 is fired, and harmonic scale 24 is rotated so that adjacent markings thereon are aligned over adjacent illuminated points on thickness scale 23 whereby the index of harmonic scale 24 is opposite the thickness of the material on thickness scale 23. A pair of brushes 25 contact slip rings 22 and are energized by trigger amplifier 26 which is energized by amplifier 27 coupled to oscillator 13 through filter 28. Battery pack 30 supplies the required filament and plate potential to oscillator 13, amplifier 27 and trigger amplifier 26.

Having described the interconnections of the elements in the system, its mode of operation will be described. Electrical energy from oscillator 13 is converted into sonic energy by crystal probe 11 which couples the sonic energy to material 12. When the contemporary value of the oscillator frequency is the reciprocal of a resonant mode half wavelength in material 12, the respective mode is excited therein, thereby increasing the energy withdrawn through crystal probe 11 and accordingly the load upon oscillator 13. The increased load upon oscillator 13 causes a corresponding increase in its plate current, but since the frequency is being swept as rotor 15 rotates, such increase is only momentary and may be sensed by suitable means, such as a resistor in series with the plate (not shown). The voltage across this resistor follows each rise in plate current upon excitation of a resonant mode with a voltage pulse. Such a pulse is produced on each revolution of motor 16 for each mode excited. Since the rotation rate of the rotor is much less than the oscillator frequency, the pulse repetition rate is small compared to the oscillator frequency. Accordingly, filter 28 is arranged to reject the band of frequencies emitted by oscillator 13 while passing the relatively low frequency pulses to amplifier 27. The amplified pulses from amplifier 27 trigger amplifier 26 which provides a voltage pulse across its output lines connected to brushes 25, which pulse is of sufficient amplitude to instantaneously fire neon bulb 21, termination of each pulse resulting in extinguishment of neon bulb 21. Since thickness scale 23 remains stationary while neon bulb 21 is rotating, the point opposite thickness scale 23 instantaneously illuminated is related to the contemporary frequency of the oscillator at the time a resonant mode is excited in the material 12, and accordingly the half wavelength of such resonant mode. The relatively rapid rotation rate effected by motor 16 results in these points appearing to be continuously illuminated.

Since the thickness of the material is substantially equal to the half wavelength of the fundamental resonant mode, it is desired to know the half wavelength of the latter. According to the invention, this is readily determined by now rotating harmonic scale 24 until adjacent markings thereon are aligned with adjacent illuminated points opposite thickness scale 23. The index of harmonic scale 24 the points on scale 23 to the actual thickness of the material. This will be better understood by referring to FIG. 2, which shows thickness scale 23 and rotating scale 24 in greater detail. Note that the thickness scale is essentially the D scale on a circular slide rule. In other words, circumferential distance between adjacent markings designated by an integer is proportional to the logarithm of the ratio of the two corresponding integers for clockwise movement about the scale.

A similar relation exists with respect to the markings and associated integers on harmonic scale 24 for counterclockwise movement about this scale, the harmonic scale corresponding to the CI scale on a circular slide rule. However, it is to be observed that whereas the thickness scale is further subdivided, only the integral markings are retained on harmonic scale 24, each of these markings being associated with a corresponding harmonic as will become apparent from discussion which follows. At the index of this scale is arrow 31. A viewing slit 32 is indicated by dotted lines. This restricts flashes from neon bulb 21 from being visible except when positioned behind viewing slit 32. Thus, no indication is given when the oscillator is not being swept between the desired limit frequencies. Neon lamp 21 is indicated by dotted lines in FIG. 2A.

To illustrate the ease with which a direct indication may be readily obtained, adjacent flashes are represented at 33 and 34 respectively directly opposite indications of 92 and 105 on thickness scale 23 respectively. If the latter scale has been rotated in the manner described below to occupy a position whereby for the particular material under test, the index of that scale corresponds to a thickness of 10 milli-inches, then the flashes at 33 and 34 correspond respectively to wavelengths of 9.20 and 10.50 mils respectively. To determine the thickness of the material under test, it is only necessary to rotate harmonic scale 24 until adjacent markings thereon are aligned with the flashes at 33 and 34. This is illustrated in FIG. 2B from which it is seen the corresponding markings are designated by the integers 8 and 7 respectively indicating that the flash at 33 and 34 correspond respectively to excitation of the eighth and seventh harmonic modes. In this position, index 31 of scale 24 now points to a reading of 735 on thickness scale 23, indicating that the actual thickness of the material is 73.50 mils.

Calibration of the instrument is readily obtained for a particular material in the following manner. A sample of the material of known thickness is positioned adjacent the crystal probe 11. Thickness scale 23 is then rotated until the value of this known thickness is aligned with the most counterclockwise flash seen through slit 32. The apparatus is then immediately ready to accurately ascertain the thickness of other samples of this material. When it is desired to gauge the thickness of different materials, then it is only necessary to calibrate the apparatus with a sample of known thickness of the new material.

The relative positions of the two scales 23 and 24, slit 32 and neon bulb 21, attached to rotating disk 18 will be better understood by referring to FIG. 3 which is a view in a plane including the axis about which the scales may be rotated. The disks are attached to panel 35 which is a part of the casing housing the motor and electrical circuitry, with slot 32 being in panel 35. The thickness scale 23 is seen to be mounted between panel 35 and harmonic scale 24. The means for attaching the latter scales to panel 35 are not shown, such means being within the skill of one familiar with the art. The axis of rotation of disk 18 is seen to coincide with that of scales 23 and 24 and neon bulb 21 is seen positioned substantially the same radial distance from the axis as viewing slit 32. The electrodes of bulb 21 are connected to slip rings 22 which, along with disk 18, are secured to shaft 36 whereby all three are rotated by motor 16 (FIG. 1).

As indicated above, the frequency is varied between limit frequencies during the sweep interval whereby the instantaneous oscillator frequency is proportional to the antilogarithm of the angular orientation between the sweep capacitor rotor and the sweep capacitor stator and consequently the angular orientation of the indicating neon bulb 21. This relation is obtained by patterning the plates of rotor 15 and stator 14 to cause the area between respective rotor and stator blades to increase with increasing rotation in a manner which changes the desired capacity change to effect frequency variation in the desired manner over the selected limits. Templates of such plates are illustrated in FIG. 4 where a stator plate 37 is illustrated opposite a rotor plate 38. The angle $\phi$ is measured from the upper edge 41 of stator plate 37 clockwise to the short edge 42 of rotor plate 38, rotation of the latter being clockwise as indicated. The desired sweep interval begins when edge 41 is aligned with edge 42; that is, $\phi$ is zero.

At this time, neon bulb 21 is opposite the counterclockwise edge of slit 32, and clockwise rotation of rotor 38 causes the oscillator frequency to decrease in the desired manner until edge 43 of rotor 38 is aligned along edge 41 of stator 37, at which time neon bulb 21 is opposite the clockwise edge of slit 32. During the remainder of the rotor revolution, neon bulb 21 is not visible and no visual response to the excitation of resonant modes in the material being gauged will be observed. The distance along edge 41 of the edge 44 of rotor 38 is an exponential function of the angle $\phi$ as is the radial distance from the same axis along edge 42 of rotor 38 of edge 45 of stator 37. The area between plates, $A_d$, is indicated by the stippled region. The particular function will be better understood from the following derivation in which the parameters graphically represented in FIG. 5 are utilized.

Referring to FIG. 5, the shaded area, designated $A_d$, represents the same shaded area between respective rotor and stator plates at a particular angle $\phi$ with $r2$ representing the distance from the axis of rotation of rotor plate 38 to edge 44 at the given angle $\phi$ and $r1$ representing the distance from the same axis of rotation 46 to the edge 45 of stator 37 along rotor edge 42 at the given angle $\phi$.

These plates are so designed that the frequency of the oscillator varies as the antilog of clockwise rotation. That is to say, if $f_s$ designates the frequency of the oscillator with angle $\phi$ equal to zero then:

$$f = f_s \text{ antilog } k\phi$$

The frequency at any rotor position $\phi$ during a sweep interval is thus related as a log function of the rotation with $f_s$ being the frequency for $\phi = 0°$, the negative sign indicating decreasing frequency with clockwise rotation (increasing $\phi$). Under these circumstances, markings on the harmonic scale 24 (FIG. 2) can be matched up with the visual indications on the thickness scale 23. The following relationship exists:

For the rotor plates:

$$r2 = \frac{6.55 C_s d}{N} + \frac{D^2}{4} e^{.3665\phi}$$

For the shaft clearance hole in the stator plate:

$$r1 = \frac{D}{2} e^{.3665\phi}$$

where:

$\phi$ is in radians
$C_s$—the total stray capacity of the oscillator circuit.
$d$—the spacing between the adjacent stator and rotor plates.
$D$—the diameter of the rotor shaft clearance hole. (This is actually the diameter that a circular cut-out would have in a stator plate to clear the rotor shaft. Since the cut-out must be of a spiral shape, D is equal to $2r1$ when $\phi$ equals zero.)
$N$—the number of capacitor sections (air-gaps between adjacent plates).

For a sweep ratio of 2:1, it is desirable to limit the viewed portion of the rotating neon light 21 to 108°. Accordingly, the arc of viewing slit 32 in the panel subtends an angle not greater than 108° and preferably less to prevent capacitor fringe effects from being viewed through the window. The following example will indicate the procedure for making this determination and enable those skilled in the art to determine different viewing angles for different sweep ratios. Rewriting the frequency-rotor angle relationship set forth above, $f/f_s = e^{-k\phi}$.

For a circular slide rule scale which closes upon itself, such as scales 23 and 24, the numerical divisions are spaced such that a 10:1 ratio is obtained over the entire circumference (360°).

Let R be the desired numerical ratio
Then $$R = e^{-k\phi} \text{ and } \ln R = -k\phi$$

(changing to base 10)

$$\log R = -k_1 \phi$$

Then $$\frac{\log 2}{\log 10} = \frac{-k_1 \phi_2}{-k_1 360°}$$

where $\phi_2$ is the angle of rotation for a 2/1 numerical ratio, 360° being the angle of rotation for the chosen 10:1 ratio about the scale circumference.

$$\phi_2 = 360 \log 2 = 108.37°$$

The constant $k$ is related to the choice of the circular scales as follows:

Since $$\frac{f}{f_s} = e^{-k\phi}, \quad -k = \frac{\ln \frac{f}{f_s}}{\phi}$$

where $\phi$ is in radians, $$k = \frac{\ln 10}{2\pi} = 0.3665$$

With reference to FIG. 6, there is illustrated a combined block-schematic circuit diagram of a cathode ray tube display system adapted to operate with the sonic thickness measuring system of FIG. 2. As in FIG. 2, the rotor 15 is rotated relative to stator 14 by motor 16. The crystal probe 11 is placed adjacent the material whose thickness is to be determined, and filter 28, amplifier 27, trigger amplifier 26 and battery 41 function in the same manner as described above in connection with the description of FIG. 2.

A visual indication of the thickness is obtained upon the face 51 of the cathode ray tube in oscilloscope 52, the vertical plates of the latter being energized by vertical deflection amplifier 53 which amplifies the pulse response from trigger amplifier 26. The horizontal plates of oscilloscope 52 are energized by horizontal sweep amplifier 54 which is energized by the sawtooth signal waveform 55 derived across the capacitor 56. The latter is charged by battery 57 through resistor 58 when switch 60 is actuated by cam 61 driven by motor 16. At all other times, capacitor 56 is shorted to ground. Cam 61 is so oriented that switch 60 moves to the open position when the angle $\phi$ (FIG. 4) is zero and remains open until this angle becomes substantially 108°. Thus, by choosing resistor 58 and capacitor 56 to form a network with a relatively long time constant, the potential across capacitor 56 rises as a substantially linear function of time as the frequency of the oscillator is swept over the desired range and returns to zero when the cam 61 no longer actuates switch 60 whereby capacitor 56 is shorted through the contacts of the latter to ground. The beam in oscilloscope 52 is accordingly deflected from left to right during this sweep interval and each resonant mode response from trigger amplifier 26 will effect a vertical deflection on the tube face 51, thereby producing a series of pips on the tube face for each resonant mode excited during the desired sweep interval. Since the frequency is a function of the antilog of the angle $\phi$ which, in turn, is a linear function of time, and the horizontal position of the beam during the sweep interval is a linear function of time, the separation in frequency of adjacent pips is related to the antilog of the distance therebetween. In effect then, there is obtained a plot of resonant modes as a function of frequency on a logarithmic scale, and since half wavelengths of each mode is the reciprocal of the associated frequency, a plot of the half wavelength of each mode excited during the sweep interval is also presented on a logarithmic scale. It might theoretically be possible to cover a 10:1 thickness ratio but in practice, a 2:1 ratio is desirable and there are times when it would be advantageous to cover a smaller range, as when testing for a small deviation from a nominal thickness.

Referring to FIG. 7, the cathode ray tube face 51 is illustrated with the horizontal scale being diagramically indicated by line 62. By appropriately adjusting the horizontal gain and centering controls, the horizontal trace is arranged to occupy a position between marks 62a and 62b on the line 62. The scale 62 may, if desired, be calibrated in terms of thickness. Slidably arranged opposite thickness scale 62, is harmonic scale 63. This scale has a series of markings along the lower edge thereof which correspond to the integral markings on a CI slide rule scale. Accordingly, the actual thickness of a material under test may be obtained by aligning adjacent markings on the oscilloscope harmonic scale 63 with adjacent pips and the position of the scale 63 will then indicate thickness. The scale 63 may also have a series of markings along the upper edge thereof adapted to register with a mark 63a, to thus indicate thickness.

Calibration is readily obtained by placing the probe 11 adjacent a material of known thickness and adjusting the horizontal trace position with the horizontal centering control until the indicated pips are opposite the markings on the lower edge of scale 63, the scale 63 being adjusted to position the mark 63a opposite the known thickness.

Referring to FIG. 8, still another type of oscilloscope visual indicating means is illustrated. A transparent strip 64 is slidably positioned over the oscilloscope tube face 51 whereby the horizontal lines 65 are parallel to the horizontal trace and are each associated with a known thickness. Each of the lines 66 which intersect the horizontal lines 65 are associated with an integral number.

Referring to FIG. 9, the use of this transparent chart 64 to determine thickness is illustrated. The object is to obtain coincidence between adjacent pips and adjacent points of intersection between a particular horizontal line 65 and the line 66. In FIG. 9A, only one point on the line corresponding to a thickness of 140 intersects a pip. In FIG. 9B, it is seen that matching is not quite complete for a thickness of approximately 205, while in FIG. 9C, it is seen that matching occurs for a thickness of 210. The chart may be prepared by utilizing samples of known thickness which are excited in harmonic modes, two thicknesses being sufficient to establish the locus of a particular harmonic line 66.

It should be noted that the system of FIGURES 8 and 9 has distinct advantages, in that it does not depend upon logarithmically spaced pips and therefore does not require a special capacitor. In addition, the scale calibrations are made empirically, do not have to match any theoretical curve, and can hence be made to fit the actual pip spacing in practice. It is to be noted that the pips, and particularly the first few harmonic pips, do not always appear with exact logarithmic spacing due to cross coupling between modes of oscillation of the test specimen.

Thus, it is seen that apparatus embodying the principles of this invention provides a substantially direct indication of the thickness of the material, is compact and sufficiently light in weight to be readily portable, yet utilizes the available space to a maximum so as to provide an accurate reading of the thickness. A resultant advantage of the apparatus is that the range of thicknesses which may be directly measured, is markedly increased.

The specific embodiments described herein are by way of example only, it being apparent that those skilled in the art may make numerous modifications of and departures from the specific apparatus without departing from the inventive concepts. Consequently, the invention is to be construed as limited only by the spirit and scope of the appended claims.

What is claimed is:

1. In apparatus for measuring the distance between opposite faces of a part, a variable frequency generator, an electro-mechanical transducer electrically coupled to said generator and arranged to transmit sonic waves into one face of the part to travel toward the opposite face of the part and to be reflected therefrom back toward said transducer, there being a plurality of resonant frequencies at which the reflected waves arrive back at said transducer in phase with the transmission of waves therefrom to change the loading on said generator, said resonant frequencies being determined by the thickness of the part and the speed of sonic wave travel therein, indicating means coupled to said generator and arranged to produce visible indications in response to abrupt changes in loading of said generator, means effecting movement of said indicating means along a certain path, sweep means operated in synchronism with said movement-effecting means and arranged to effect a continuous change of the frequency of said generator through a range including a plurality of said resonant frequencies with the instantaneous frequency of said generator being proportional to the anti-logarithm of the distance of movement of said indicating means along said path, a scale member supported for adjustable movement along a path adjacent and parallel to said certain path and having successive markings therealong adapted to be aligned with successive ones of said visible indications, said markings being positioned at points which are a logarithmic function of the distance along said scale member, and logarithmic scale means for indicating the adjuster position of said scale member and calibrated according to the thickness of the part.

2. In apparatus for measuring the distance between opposite faces of a part, a variable frequency generator, an electro-mechanical transducer electrically coupled to said generator and arranged to transmit sonic waves into one face of the part to travel toward the opposite face of the part and to be reflected therefrom back toward said transducer, there being a plurality of resonant frequencies at which the reflected waves arrive back at said transducer in phase with the transmission of waves therefrom to change the loading on said generator, said resonant frequencies being determined by the thickness of the part and the speed of sonic wave travel therein, indicating means coupled to said generator and arranged to produce visible indications in response to abrupt changes in loading of said generator, means for effecting movement of said indicating means in a circular path about a certain axis, sweep capacitor means coupled to said movement-effecting means for rotation about said axis and arranged to effect a continuous change in the frequency of said generator through a range which includes a plurality of said resonant frequencies with the instantaneous frequency of said generator being proportional to the anti-logarithm of the angle of movement of said indicating means about said axis, a scale member supported for adjustable movement about said axis in a circular path adjacent said circular path of movement of said indicating means and having successive markings thereon adapted to be aligned with successive ones of said visible indications, said markings being positioned at points which are a logarithmic function of the angle about said axis, and logarithmic scale means for indicating the adjusted angular position of said scale member and calibrated according to the thickness of the part.

References Cited in the file of this patent
UNITED STATES PATENTS

| | | |
|---|---|---|
| 2,431,234 | Rassweiler et al. | Nov. 18, 1947 |
| 2,469,289 | Beard et al. | May 3, 1949 |
| 2,557,969 | Isely | June 26, 1951 |
| 2,846,875 | Grabendorfer | Aug. 12, 1958 |